July 17, 1951 — C. J. FORD ET AL — 2,561,016
SAFETY STANCHION
Filed March 17, 1950 — 2 Sheets-Sheet 1
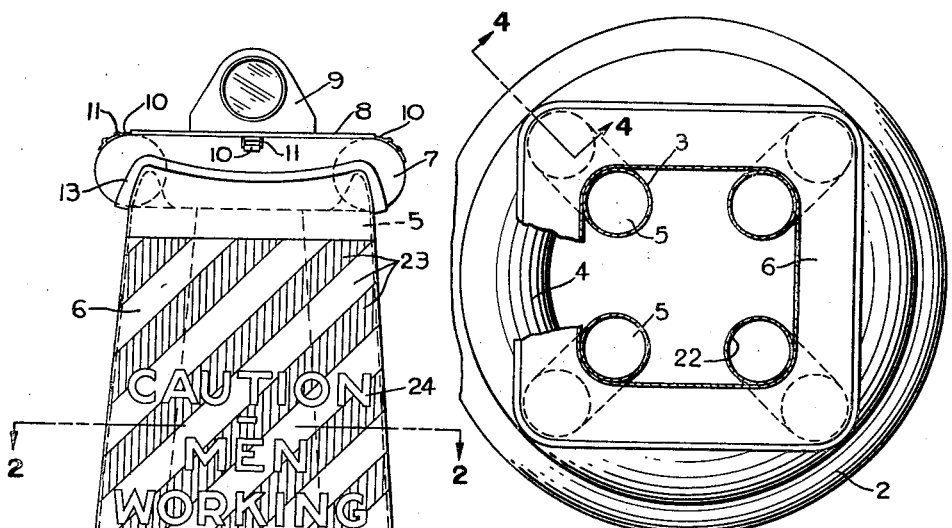
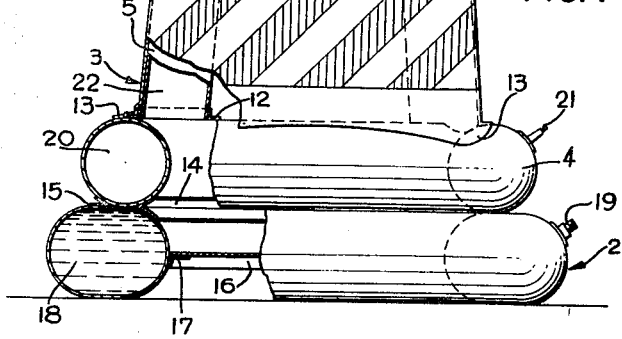
FIG. 1
FIG. 2
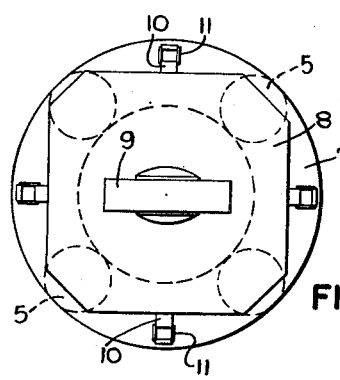
FIG. 3
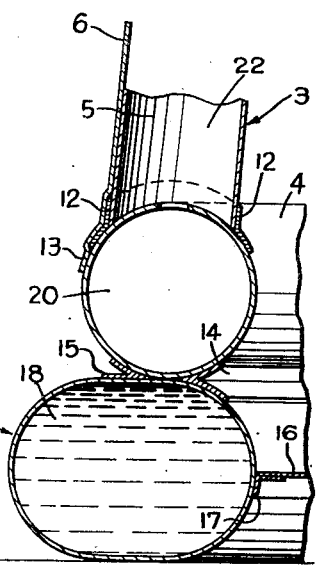
FIG. 4
INVENTORS
CHARLES J. FORD
RALPH L. MILLER
BY
R. L. Miller
ATTORNEY July 17, 1951

C. J. FORD ET AL 2,561,016

SAFETY STANCHION

Filed March 17, 1950

2 Sheets-Sheet 2

INVENTORS
CHARLES J. FORD
RALPH L. MILLER

BY

*R. L. Miller*

ATTORNEY

Patented July 17, 1951

2,561,016

UNITED STATES PATENT OFFICE 2,561,016

SAFETY STANCHION

Charles J. Ford and Ralph L. Miller, Akron, Ohio, assignors to Wingfoot Corporation, Akron, Ohio, a corporation of Delaware Application March 17, 1950, Serial No. 150,312

6 Claims. (Cl. 40—125)

The present invention relates to a novel form of collapsible or fluid inflatable safety stanchion. More particularly, the present invention is concerned with a new type of a completely fluid inflatable rubberized fabric structure for use as a highway warning device or similar form of danger signal.

One of the major problems existing with the conventional forms of barricades, signal supports and warning devices lies in the fact that they are primarily of rigid construction employing wood, metal pipe, metal angles, and other similar material. These existing forms of safety stanchions are the source of frequent trouble in that they are capable of causing serious bodily injury and property damage as a result of persons and vehicles colliding with them. Thus, a demand has arisen for a form of safety stanchion which is, in itself, less destructible and at the same time less dangerous to person and property.

It is, therefore, an object of the present invention to provide a form of safety stanchion which will conform to the aforementioned requirements for safety.

It is a further object of the present invention to provide a substantially indestructible safety stanchion which is capable of being collapsed for ease in storage and handling, but may be readily inflated with fluid for use.

Other objects and advantages of the novel safety stanchion of the applicants will become apparent from the following description of two forms of structure which embody the principles of the invention.

Figure 5:
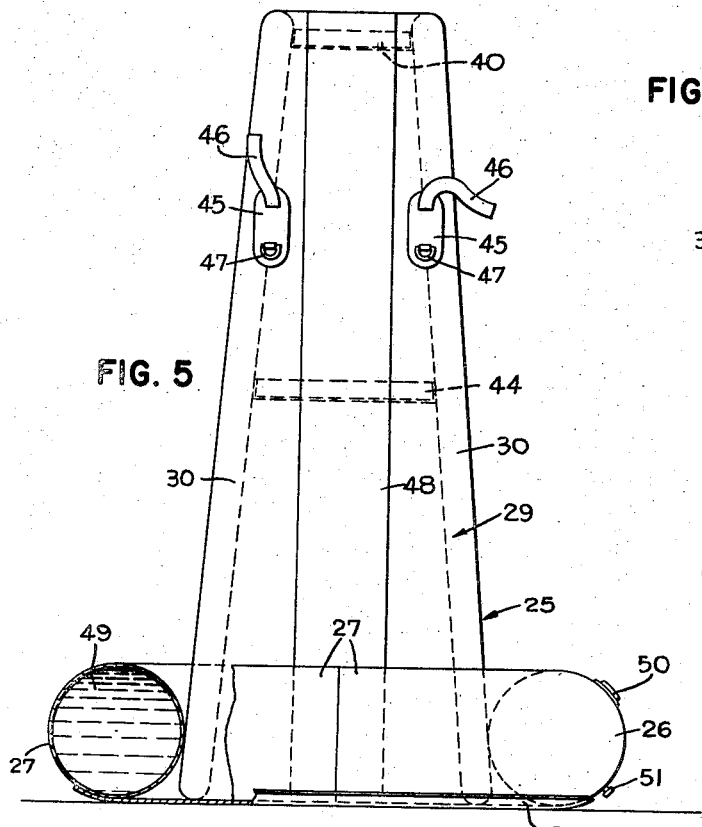
Figure 7:
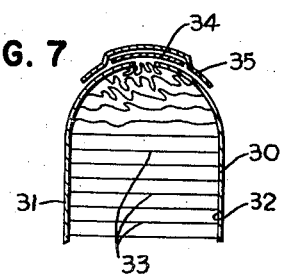
Figure 8:
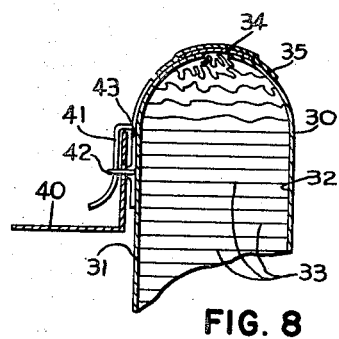
Figure 6:
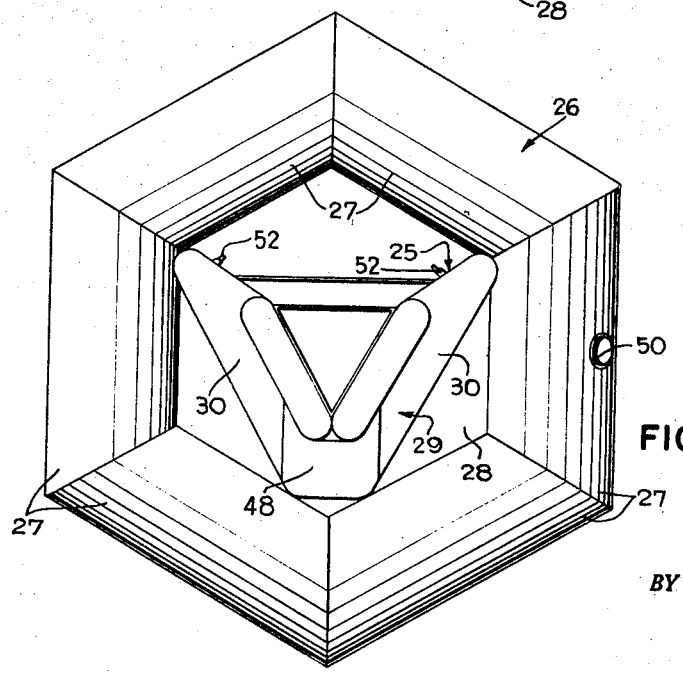
Figure 9:
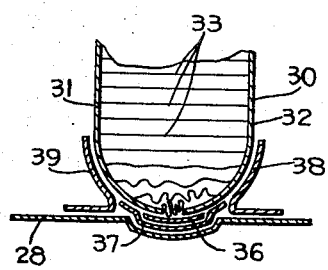

In the drawings, Fig. 1 is an elevation, with parts broken away, of one highly advantageous form of safety stanchion embodying the invention. Fig. 2 is a horizontal cross section taken along the line 2—2 in Fig. 1. Fig. 3 is a plan view of the top portion of the device of Fig. 1. Fig. 4 is an enlarged fragmentary cross section of the base structure of the safety stanchion of Fig. 1. Fig. 5 is an elevation of another form of safety stanchion to which the invention relates. Fig. 6 is a plan view of the device of Fig. 5. Figs. 7, 8, and 9 are enlarged fragmentary views taken in section of the vertical supporting structure of the unit of Fig. 5.

In Fig. 1 of the drawings, the reference numeral 1 identifies one form of collapsible lighthouse structure or safety stanchion, generally. The safety stanchion 1 comprises a generally tubular base portion 2 with which is associated a vertically disposed supporting structure 3 arranged in substantially normal relation to the base portion. The base portion 2 of the safety stanchion 1 is adapted to be placed on the surface of the ground or highway and suitably weighted in a manner hereinafter described to enable the supporting structure 3 to be disposed and remain in an upright position at all times and under all conditions.

The supporting structure 3 is provided with a generally tubular base ring 4 to the outer periphery of which is secured a plurality of vertically extending tubular elements 5 forming a structure which, together with a fabric enclosure or envelope 6, simulates a truncated pyramid in form. The several vertically extending tubular elements 5 are jointed with and serve to support an upper generally tubular ring 7. On the periphery of the upper ring 7 is disposed a platform 8 which may be formed of fabric, pressed wood, plywood, masonite, or other suitable material, affording sufficient rigidity to support a flasher light or signal 9. The platform 8 is secured in place as by means of a plurality of tapes 10 which engage a corresponding number of loops 11 secured to the upper ring 7.

The several vertically extending tubular elements 5 are advantageously formed of rubberized fabric material and secured in place on the base ring 4 by means of the tapes 12 extending in the form of a collar about the base of the tubular elements and cemented in place. The fabric envelope which is also formed of rubberized fabric material is provided at its extremities with projecting portions 13. These projecting portions 13, at the lowermost extremity of the envelope 6, overlay the several tapes 12 securing the base of the tubular elements 5 in place on the base ring 4. The projecting portions 13 of the envelope 6 at the uppermost extremity thereof are cemented in place and securely fixed to the outer periphery of the upper ring 7 so as to overlay the uppermost ends of the tubular elements 5 where they join the upper ring.

The base ring 4, which is advantageously of a somewhat smaller diameter than the tubular base portion 2, is secured to the latter by means of the inner crotch tape 14 and a similar outer crotch tape 15. A rubberized fabric web member 16 is advantageously secured to the tubular base portion 2 of the safety stanchion 1 by means of suitable crotch tapes 17 in a position intermediate the ground contacting surface of the tubular base portion and that portion of its periphery to which the base ring 4 is attached. It will be readily understood that the web member 16 may be disposed at the ground contacting surface as well as in the intermediate position shown or it may be eliminated entirely.

The tubular base portion 2 is adapted to be filled with a body 18 of weighting fluid which is admitted to the interior of the tubular element as by means of the valve unit 19. The valve unit 19 is advantageously of a type capable of providing an attachment for a water hose in order that water may be employed to provide the desired weight for the safety stanchion 1 to enable it to stand upright with the supporting structure 3 in vertical relation against a wind or other pressure or contact with the surface of the stanchion. In addition to the body 18 of weighting fluid disposed internally of the tubular base portion 2, water, soil, stones, or other forms of weighting means may be placed on the surface of the web member 16 in those cases where such a member is employed in the construction of the tubular base portion.

The base ring 4 has an inner chamber 20 which is capable of being filled with air, carbon dioxide, or other suitable gas under pressure through the medium of the valve 21. The chamber 20 communicates with an internal chamber 22 in the tubular elements 5 which are in turn interconnected with the interior of the upper ring 7. It will be understood that the inflation of the base ring 4 thus serves to fill the several tubular elements 5 and the upper ring 7 with air or gas under pressure simultaneously.

The envelope 6 may be treated in any suitable fashion to afford a means of indicating approaching danger. The envelope 6 illustrated in Fig. 1 of the drawings employs a suitable identification means such, for example, as the series of diagonal stripes 23 which may be of alternate colors to attract attention of passing motorists and pedestrians and warn them to exercise caution. In addition, a suitable sign or lettering such as that identified by the reference numeral 24 may also be readily applied to the outer surface of the envelope 6 in addition to the strips 23.

Another form of safety stanchion with which the principles of the present invention are advantageously employed is identified by the reference numeral 25 in Fig. 5 of the drawings. The safety stanchion 25 comprises a base portion 26 of generally tubular construction embodying a plurality of tubular segments 27 arranged in the general pattern of a hexagon. On the bottom of the base portion 26 is secured a web member 28, while a vertically disposed supporting structure 29 is positioned in the base portion 26 and on the web member 28. The supporting structure 29 is disposed in substantially normal relation to the base portion 26 and embodies two vertical double ply fabric walls 30 which are arranged substantially in the form of a V in cross section.

The vertical walls 30 comprise fabric sheets or plies 31 and 32 which are fabricated in spaced parallel relation to each other and maintained in that relation by means of a large number of woven threads or cross ties 33. The ends of the fabric sheets 31 and 32 forming the vertical walls 30 are joined at the top of the walls by means of a tape 34 with an overlaying tape 35 securing the former in place. The bottom of each vertical wall 30 is similarly formed with the fabric plies 31 and 32 being joined by a tape 36 and an overlaying tape 37. The base of each of the vertical walls 30 is secured in place on the web member 28 as by means of inner and outer crotch tapes 38 and 39, respectively.

The disposition of the vertical walls 30 in a converging relationship thus forms a substantially truncated pyramidal structure lacking one of the wall surfaces. The vertical walls 30 are joined adjacent the uppermost ends thereof by means of a support or stiffener panel 40 which is demountably attached to each of the walls by means of fastening tapes 41, engaging rings 42 having anchoring patches 43 thereon securing them to the innermost surfaces of the fabric plies 31. A similar web plate or stiffener panel 44 is disposed between the two vertical walls 30 at a point substantially intermediate the uppermost ends of the vertical walls and the web member 28. The web plate 44 is adapted to be demountably attached in much the same fashion as the stiffener panel 40.

A pair of mounting devices or patches 45 embodying fastening tapes 46 and rings 47 are provided on the vertical walls 30 for the purpose of attaching a warning sign or other similar form of notification to the structure adjacent the fabric front panel 48 which joins together the converging edges of the vertical walls 30. As in the case of the safety stanchion 1, the base portion 26 of the stanchion 25 may be filled with a body 49 of weighting fluid. The body 49 of weighting fluid which may advantageously be water or other suitable liquid available on the site where the stanchion 25 is erected is introduced to the base portion 26 through the fill opening 50. A suitable drain outlet 51 may be provided on the under side of the pipe portion 26 adjacent the web member 28 to facilitate the drainage of the weighting fluid therefrom. Suitable inflating valves 52 are provided on the vertical walls 30 to insure the complete air or gas inflation of the vertical supporting structure 29.

It will be understood that either form of safety stanchion 1 or 25 may be so constructed that a suitable manual or an automatic release mechanism (not shown) may be applied to the base ring 4 or the vertical walls 30 for the reception of cylinders of gas under pressure. This form of inflating means may be substituted for or may be used in conjunction with the valves 21 and 52 on safety stanchions 1 and 25, respectively. Such inflation means may also include portable gas cylinders which may readily be connected to the units, thereby rendering the safety stanchions 1 and 25 more universal in their application for any emergency. Thus, any suitable inflating medium may be employed.

While certain representative embodiments and details have been shown for the purpose of illustrating the invention, it will be apparent to those skilled in this art that various changes and modifications may be made therein without departing from the spirit or scope of the invention.

We claim:

1. A safety stanchion comprising a base portion; means on the base portion for the introduction of a weighting fluid to the base portion; a supporting structure disposed normal to the base portion and supported thereby, said supporting structure embodying a plurality of generally tubular elements of rubberized fabric construction and being joined together for fluid inflation; and means on at least one of the tubular elements for the introduction thereto of an inflating fluid.

2. A safety stanchion comprising an endless rubberized fabric base portion; means on the base portion for the introduction of a liquid thereto; at least two endless members arranged in spaced parallel concentric relation to the base portion; a plurality of generally tubular elements arranged in mutually spaced relation connecting together the several endless members; and means on at least one of the endless members for the introduction thereto and to the tubular elements of an inflating fluid.

3. A safety stanchion comprising an endless rubberized fabric base portion; a hose connection on the base portion; a web member secured to the base portion; a pair of annular members arranged in spaced parallel concentric relation to the base portion; a plurality of generally tubular elements being arranged in spaced relation to each other and interconnecting the annular members; an envelope encompassing the several tubular elements and secured at its extremities to the annular members; a platform detachably secured to the uppermost annular member; and valve means on at least one of the annular members.

4. A safety stanchion comprising a base portion; means on the base portion for the introduction thereto of a weighting fluid; a supporting structure disposed in substantially perpendicular relation to the base portion; said supporting structure embodying at least two double ply fabric wall portions disposed in converging edge-to-edge relation; and means on the wall portions for the introduction thereto of an inflating medium.

5. A safety stanchion comprising a rubberized fabric base portion of generally tubular cross section; a fill opening in the base portion; a pair of double ply fabric wall portions disposed substantially normal to the base portion; a fabric panel securing together an edge of each of the wall portions in the form of a V in cross section; valve means on each of the wall portions; and a stiffener panel demountably secured to and spanning the opening between the converging wall portions.

6. A safety stanchion comprising a rubberized fabric base portion embodying a plurality of tubular segments secured in end-to-end relation in the form of a hexagon; a liquid fill opening in the base portion; a web member secured to the base portion extending across the inner diameter of the base portion; a pair of double ply fabric wall portions disposed substantially normal to and supported by the web member; a fabric panel securing together an edge of each of the wall portions in the form of a V in cross section; valve means on each of the wall portions; and at least one stiffener panel demountably secured to and spanning the opening between the converging wall portions.

CHARLES J. FORD.
RALPH L. MILLER.

REFERENCES CITED

The following references are of record in the file of this patent:

UNITED STATES PATENTS

| Number | Name | Date |
|---|---|---|
| 2,237,599 | Gilman | Apr. 8, 1941 |
| 2,333,273 | Scanlon | Nov. 2, 1943 |
| 2,449,935 | Gilman | Sept. 21, 1948 |